United States Patent [19]

Ettori et al.

[11] Patent Number: 4,824,458
[45] Date of Patent: Apr. 25, 1989

[54] DEIONIZATION OF GLASS BY CORONA DISCHARGE

[75] Inventors: Solange Ettori, Paris; Jean-Claude Peraud, Combs La Ville; James Barton, Paris, all of France

[73] Assignee: Saint-Gobain Vitrage, Courbevoie, France

[21] Appl. No.: 24,601

[22] Filed: Mar. 11, 1987

[30] Foreign Application Priority Data

Mar. 11, 1986 [FR] France ................... 86 03416

[51] Int. Cl.⁴ .................... C03C 23/00; C03C 29/00
[52] U.S. Cl. ..................... 65/30.13; 65/30.14; 65/111; 65/114; 65/32.1
[58] Field of Search ............ 65/30.13, 30.14, 32, 65/63, 65, 111, 114, 117, 157, 162, 271, 273; 204/164; 156/643, 663

[56] References Cited

U.S. PATENT DOCUMENTS

3,879,183 4/1975 Carlson ..................... 65/30.13
4,153,560 5/1979 Dinter et al. ................ 204/164
4,181,541 1/1980 Le Francois ................ 204/164

Primary Examiner—Arthur Kellogg
Attorney, Agent, or Firm—Oblon, Fisher, Spivak, McClelland & Maier

[57] ABSTRACT

The invention relates to techniques for surface deionization of glass under the effect of a corona discharge. The invention consists of treating the object which is movable in relation to the electrodes situated at a short distance from said object which is brought to a high temperature. The treatment is carried out under a continuous current which is regulated in intensity. The treatment is accordance with the invention is preferably applied to sheets of glass during their production.

11 Claims, 3 Drawing Sheets

DEIONIZATION OF GLASS BY CORONA DISCHARGE

BACKGROUND OF THE INVENTION

1. Field of the Invention

The invention relates to techniques for surface deionization of glass by movement of ions under the effect of an electrical field and, in particular, to the dealkalization of soda-lime glass.

2. Discussion of the Background

Dealkalization treatments are conventionally carried out to modify the chemical resistance, improve the fixing of surface deposits or modify certain optical characteristics of the glass.

The most frequently used deionization is of the chemical type. The glass object is subjected to a solution or an atmosphere which reacts with the alkaline ions of the glass. To facilitate the reaction, the operation takes place at a temperature which is greater than room temperature.

More recently techniques have appeared in which the surface deionization is carried out using ion migration under the effect of an electrical field.

In principle, this phenomenon is as follows. The glass, whose temperature is controlled, is placed between two electrodes. The application of the electrical field mobilizes the more easily movable ions and, in particular, the alkaline ions. Under the effect of a continuous field, the alkaline ions are moved towards the cathode and form a carbonate skin on the surface of the glass and in contact with the atmosphere. Oxygen and/or hydrogen diffuse on the surface which is exposed to the anode.

From the practical view point, it is very difficult to obtain a homogeneous treatment of the surface of the glass. The application of the field using solid electrodes leads to the formation of local spots. In order to obtain a uniform treatment, it has been suggested to subject the glass to "gaseous electrodes", preferably in a rarified atmosphere and with relatively high applied voltages, on the order of several thousand volts.

This method is particularly delicate. Due to the high voltage, there are high risks of arc formation. Also, this technique has only been proposed for actual use on small-sized specimens and under conditions which provide perfect control of the respective positions of the glass and the electrodes as well as of the atmosphere in which it is carried out. Furthermore, in accordance with this technique, the temperatures in which the operation was proposed were relatively low.

SUMMARY OF THE INVENTION

Accordingly, one object of the present invention is to provide a method for the deionization of glass which does not produce local spots and has a reduced risk of arc formation.

Another object of the invention is to provide a method for the deionization of glass which can be used on large glass objects and which can be used at relatively high temperatures.

Another object of the invention is to provide a method for the deionization of glass using a corona discharge.

Still another object of the invention is to provide a device for treating glass sheets with a corona discharge.

These objects and other objects of the present invention which will become apparent for the following specification have been achieved by the present method for the surface deionization of glass, comprising the steps of (a) heating the glass and sweeping the heated glass with a regulated corona discharge established by means of a continuous current.

BRIEF DESCRIPTION OF THE DRAWINGS

A more complete appreciation of the invention and many of the attendant advantages thereof will be readily obtained as the same becomes better understood by reference of the following detailed description when considered in connection with accompanying drawings, wherein.

DETAILED DESCRIPTION OF THE PREFERRED EMBODIMENTS

The present invention provides a method for the uniform deionization of sheets of glass by submitting them to a corona discharge sweeping the surface to be treated and by requiring intensity conditions such that arc formation is prevented.

The choice of sweeping the sheet of glass with electrodes or on the other hand, having a movable glass sheet pass under an electrode enables an identical treatment for all points on the surface as opposed to what is obtained by placing the object to be treated under one or several fixed electrodes, even if said fixed electrodes form a tight network.

In addition and contrary to what has been carried out in the past, the intensity of the current circulating between the electrodes is controlled. Such regulation enables any irregularity in the relative positioning of the sheet of glass and the electrodes or even in the variations of conductivity to be overcome. In this type of regulation, the voltage is adjusted such that at any moment the intensity is always the same. If, moreover, the electrode has the same configuration over the entire width treated, it is understood that the discharge is uniformly distributed.

To increase the stability of the discharge, it is preferably produced in a controlled atmosphere which is known to encourage plasma formation. A gaseous atmosphere containing argon is preferably used.

The entire treatment is controlled by the diffusion of ions in the treated glass. The speed of diffusion is itself very sensitive to the temperature in which the operation is carried out.

The treatment temperature comes into play not only in the kinetics of diffusion but also in the nature of the ions undergoing diffusion. The examples show the behavior of the principal elements in question. In general, it appears that for relatively low temperatures only the alkaline ions migrate under the effect of the plasma. For high temperatures, it is possible to cause both the alkaline ions and the alkaline-earth ions to migrate.

In the soda-lime glasses usually used for the most abundant productions, in particular for "plate glass" products, a very high migration of the alkaline has been noted for temperatures above approximately 400° C. The surface layer treated is particularly devoid of sodium (which is by far the alkali whose initial content is the greatest; it can reach or even exceed 15%). Likewise, above 400° C., the alkaline-earth ions, particularly calcium and magnesium, are removed from the surface layer.

It is also possible to obtain a surface migration under the effect of a corona discharge at less high temperatures. In particular, deionization can be carried out a temperatures on the order of 100° to 250° C. with a very homogeneous result over the entire surface treated. As opposed to the "high temperature" operations, it has been noted that practically only the alkaline ions migrate. This observation is valid for dealkalizations of the same amplitude, in other words which touch surface layers with the same depth. If, in the case of the low temperatures defined above, the treatment is sufficiently prolonged, elimination of the alkaline-earth migration is so small at low temperatures that for a dealkalization on the most frequently practiced depths, which are approximately 0.1 to 0.2 micrometers, it is practically undetectable. In all cases it does not provide the particularly advantageous properties which will be mentioned below. Treatment carried out under conditions situated between the so-called "high" and so-called "low" temperatures leads experimentally to difficulties related to the homogeneousness of the treatment. In some places the treated sheets show removal of the alkaline and the alkaline-earth ions and, in other places, the removal of the alkalines alone. The reasons for the observed lack of homogeneousness are not known. Nevertheless, to overcome these difficulties, it is preferable to use a temperature which is sufficiently distinct from these conditions in which the treatment appears not to be homogeneous. In the treatments in accordance with the invention, temperatures are preferably used which simultaneously provide the elimination of alkaline and of the alkaline-earth ions. It has become apparent to the inventors that this type of treatment leads to products whose properties are particularly interesting. The treatment in question provides a surface layer whose characteristics are little altered or are unaltered by the subsequent treatments to which the glass is subjected. Thus, the reheating of the glass under normal temperature conditions and for a normal period of time does not compromise the existence of a dealkalized surface layer. We will also see from the examples that the products obtained are chemically inert and have remarkable optical properties.

As we have just indicated, it is preferable in accordance with the invention to treat the glass at a sufficiently high temperature to simultaneously remove alkaline and alkaline-earth ions; however, this temperature cannot exceed that at which the softening of the glass is achieved. For conventional soda-lime glasses, the softening can occur above approximately 800° C. For this reason, a temperature preferably lower than 750° C. is used and, most frequently, a temperature which does not exceed 700° C.

Another important factor for ion migration is the required intensity. If, at first sight, it seems advantageous to have a high intensity to accelerate the treatment, however the risk of arc formation quickly becomes very important. The intensity at which one can operate with no risk also depends on the temperature, the sweep speed and the thickness of the glass. The discharge is more regular if the temperature is higher. In a simplified manner, it can also be admitted that the thicker the glass being treated, the greater the stability of the discharge. In practice, however, the thickness of the glasses treated varies only within relatively tight limits, such that this factor plays only a secondary role. It is remarkable, however, that the sweep treatment carried out in accordance with the invention, far from disturbing the formation of plasma, contributes to the stability thereof or at least facilitates the prevention of arcs. Likewise, the regularity depends on geometric conditions, i.e., configuration of the electrode and distance between the electrodes.

For linear electrodes with good localization of the corona discharge by a "point effect" and for the above-indicated temperatures, the intensity does not ordinarily exceed 400 mA per linear cm of electrode. This intensity is preferably on the order of 50 to 100 mA per linear cm of electrode. These values correspond to a treatment for an average speed on the order of 2 m/min. As we have indicated, they can be substantially higher if the sweep speed is increased.

On the other hand, a very low intensity is not desirable. In addition to the fact that the treatment is slow, a very low intensity does not provide a homogeneous discharge. In practice, the intensity should be not lower than 10 mA/cm and is preferably above 20 mA/cm for treatment temperatures above 400° C. For lower temperatures and in particular those for which, in practice, only the alkaline ions are moved, the intensity can be far less and go down to values on the order of 1 mA/cm.

In all cases, it is appropriate, as indicated above, to work with a stabilized intensity which is the only means to obtain a homogeneous treatment. This is particularly important when, as in accordance with the invention, a "sweep" of the sheet is carried out and when the instantaneous conditions, in particular temperature, state of the surface of the glass or nature of the gas in the discharge zone, are capable of limited variations but are nevertheless sensitive to the treatment.

The distance separating the electrodes or, more specifically, the part of this distance which is not occupied by the glass and in which the corona discharge is developed is a sensitive factor for the regularity of the treatment. The establishment of the discharge is more simple when the distance in question is smaller. A lower priming voltage is needed and the risks of arc formation therefore are also limited. The difficulty is to maintain a small distance in a continuous treatment, for example, on sheets of glass which can be more than one meter in width. Whatever the state of the glass, contact with one of the electrodes must absolutely be prevented, as this would result in a spot at the point of contact. If, on the contrary, the distance between electrodes were increased, the voltage required would have to be considerably increased and the risk of arc appearance would recur.

It is therefore a matter of finding a compromise between these two contradictory requirements. In practice, it is difficult to maintain a distance below 1 mm with sufficient security and it is also preferable not to exceed a distance on the order of 8 mm.

If, for reasons of technological requirements, a greater distance must be provided, it is nevertheless possible to reduce the risk of arc formation. To do this, it is preferable to carry out the treatment in a chamber under reduced pressure in relation to the surrounding atmosphere. The rarification of the gases, without substantially modifying the formation of the corona discharge, reduces the appearance of a voltage arc.

In the simplest method, the voltage applied to the electrodes is continuous throughout the treatment. To facilitate the priming of the discharge, particularly at the beginning of a new operation or after any interruption, it can be preferable either momentarily to increase the voltage or even to combine a continuous voltage with an alternating voltage. This alternating voltage, which is superposed on the continuous voltage, provides a general activation of the ions of the glass whether they are on the surface which is exposed to the anode or that which is exposed to the cathode. If necessary, such a super position can be maintained throughout the treatment.

To facilitate the priming of the corona discharge, it can also be preferable to provide, in the vicinity of the electrodes, an atmosphere which is different from that corresponding to the treatment regimen. The inventors have also shown that the use of helium enables the priming voltage to be very substantially lower in relation to that, for example, which is observed in an argon atmosphere. This gas could, if necessary, be used throughout the treatment. It is, however, preferable to limit its presence to the priming of the discharge due to its cost and also to the fact that it corresponds to a higher power consumption than that which is observed with argon.

An important advantage related to the ease of priming the discharge is the ability to separate the electrodes. In effect, one of the reasons which leads to bringing the electrodes closer to the treated surface, in spite of the difficulties which can arise from permanently maintaining very low distances between the glass and the electrodes, is the necessity of having to prime the discharge without overly increasing the voltage and, consequently, the risks of arc formation. Insofar as the use of the priming gas enables the voltage to be lowered, it becomes possible to separate the electrodes and therefore to reduce the risks of accidental contacts between the electrodes and the glass.

The time of treatment of the glass depends both on the required intensity and the extent of the desired treatment.

The higher the intensity, the more rapid the deionization. For a treatment which is carried out by a sweep of the sheet, the sweep speed can therefore be increased for strong intensity.

One application of the invention consists of arranging the surface deionization step directly on a continuous production line for plate glass. In such a case, it is appropriate to make it such that the treatment of the glass is sufficient when it passes at the speed of production imposed by the line. If necessary, when the speed of production is very high and the treatment which can be obtained at the maximum intensity is insufficient, several successive electrodes can be arranged on the path of the glass in order to achieve the desired result.

In addition, the use of several electrodes, as necessary, give further uniformity to the treatment obtained.

Although, in principle, the deionization can be carried out on a variable depth, as the deionization progresses the glass becomes less and less conductive and the treatment of the deeper layer calls for the application of higher and higher voltages. In addition, in normal applications, treatment on an extremely small depth is most often sufficient to obtain adequate properties, with the important fact being to have a perfectly uniform treatment. Therefore, for the planned uses, which will be indicated below, deionization on layers as thin as one-tenth of a micron is very appropriate. In practice, the treated thickness does not exceed one micrometer and is most often below 0.5 micrometer.

Figure 1:
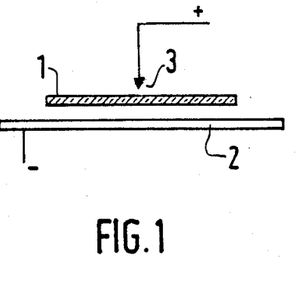
FIG. 1 is a diagram of a preferred embodiment showing the arrangement of the different elements required for carrying out the present method using a corona discharge.

Referring now to the drawings, to obtain a plasma the sheet of glass 1 is placed between two electrodes 2 and 3 which are subjected to high voltage. In principle, to facilitate the appearance of a plasma, one of the electrodes has an edge while the one opposite it extends over a certain surface. In fact, when the sheet of glass is arranged between two electrodes, without contact therewith, its surfaces play a role comparable to that of the flat electrode. Under these conditions, two electrodes having a point effect can be used. In all cases, the corona discharge is produced on either side of sheet 1.

For the treatment of sheets of glass, the tests carried out by the inventors with the sheets of glass resting directly on the cathode did not give satisfactory results.

Spots appeared on the surface in contact with the cathode, and the spots corresponded to the effective contact points of the sheet and the cathode. Even for very flat sheets, perfect contact is practically imposssible with a rigid electrode. This is true for tests carried out in a static manner and is even more true in a dynamic regimen, that is, when the sheet and the electrode have relative movement. For these reasons, in the application of the invention, except for particular applications which will be mentioned below, the sheet of glass passes between the electrodes without being in contact with either one. This method of operation enables small-sized irregularities to be overcome which can appear in the shape of either the glass or the electrodes and is particularly appropriate for integration into a production line where this type of irregularity inevitably appears.

Nevertheless, the adjustment of the position of the electrodes with regard to the sheet must be carried out with good precision. In effect, the distances separating the electrodes from the sheet, which are one of the important factors in the good working of the treatment, are relatively small and the possible deviations in relation to the normal position are very narrow if accidental contacts, which would lead to the formation of spots on the surface of the glass, are to be avoided. If the sheets have large irregularities, such as undulations of a size greater than the deviations allowed by the distances between the electrodes, it is possible to overcome such difficulties by making the position of the electrodes dependent on the surfaces of the sheet of glass.

In the diagram of FIG. 1, the anode is shown in the upper part. It is, therefore, the upper surface of the sheet which will undergo deionization.

Figure 2:
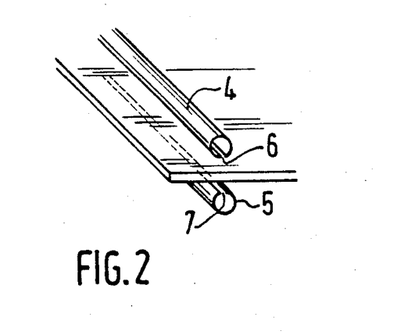
FIG. 2 shows, in cross-section, the elements of FIG. 1 as used for the tests in accordance with the invention.

A series of experiments has been carried out on an assembly such as is shown in FIG. 2. The electrodes themselves in this case act as passages for the plasmagenic gas. In the reported tests, this gas is argon.

The two electrodes 4 and 5 are in the form of hollow cylindrical tubes. Inside these tubes are arranged means forming baffles which guarantee uniform distribution of the gas over the whole length of the electrode from the joint with the source of gas.

The tubes have a slit 6, 7 along a generator of the cylinder. This narrow slit allows the flow of the argon. Each lip of the slit constitutes an edge arranged opposite the opposing electrode.

Due to the proximity of the sheet of glass 1, each electrode emits a gaseous current which controls the nature of the gas in the zone of the corona discharge. Even when the emission is relatively small, dynamic control of the atmosphere is provided. Basically, this is therefore composed of the gas emitted from the electrodes. To this gas can be mixed, in part, that constituting the surrounding atmosphere; in the majority of cases, this will be air.

It is possible that the control of the atmosphere cannot be localized solely in the vicinity of the electrodes. Depending on the conventional techniques for the treatment of the sheets of glass, it is possible to work in a closed chamber filled with the gaseous mixture selected. Also, in this case, a dynamic sweep enables the composition of the working atmosphere to be absolutely constant.

Further in the case of treatment in a chamber with a controlled atmosphere, it is also possible to work under reduced pressure. This type of treatment, requiring a more or less high partial vacuum, can of course be carried out in a discontinuous manner but is also used conventionally on continuous production lines, particularly for the deposit of thin layers.

The technical solutions described elsewhere for the production of these low pressures can be used in the treatment in accordance with the invention.

It goes without saying that where the treatment is carried out in a chamber in which the atmosphere is controlled, the electrodes only function as electrical conductors. However, even in the absence of such chambers, the distribution of the plasmagenic gas in the immediate vicinity of the zone in which the corona discharge is developed can be provided by means other than the electrode itself. The advantage of the use of the electrode to bring the plasmagenic gas is that, by distributing the gas at the precise point where it is used, it is possible to limit the consumption of the gas under the best conditions. It can further be noted that the consumption is lower when the space in which the corona discharge takes place is itself more restricted, which provides and additional reason to attempt to bring the electrodes closer to the sheet.

Figure 7:
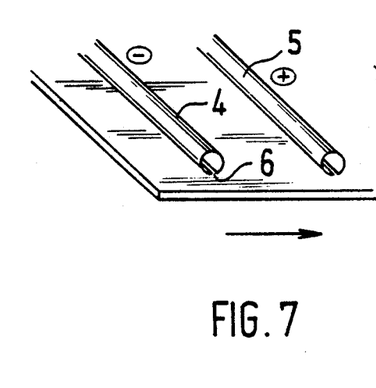
FIG. 7 is a diagram showing another arrangement of the elements used in the type shown in FIG. 2.

In the configuration shown in FIG. 7, the two electrodes are located on the same side of the sheet of glass. The inventors have, in effect, noted in a surprising manner that this arrangement also enabled the dealkalization of the surface exposed to the electrodes under analogous conditions to those observed when the two electrodes are situated on either side. As above, the two electrodes are situated at a short distance from the sheet of glass and a gaseous plasmagenic current is maintained between the electrode and the sheet.

It can be noted that the formation of plasma can be obtained for electrodes which are relatively distant from one another. Thus, a distance of 100 mm can be reached or exceeded between anode and cathode. The distance is preferably limited to that which guarantees the absence of arcs. Ordinarily, for the temperatures considered and at the voltages applied for the formation of the plasma and for a passage on the order to one meter per minute, a distance of 20 to 60 mm is satisfactory. This distance can be reduced but, in this case, it is ordinarily necessary to arrange a nonconductive screen between the electrodes at the point where the arcs would be likely to form, this is, in immediate proximity of the sheet. It should be emphasized that the increased distance between the electrodes does not necessitate substantial modifications of the voltages which it is necessary to apply in order to obtain the plasma.

In the configuration shown in FIG. 7, it is preferable to arrange the cathode upstream of the anode in relation to the direction of passage of the sheet.

The presence of the two electrodes on the same side of the sheet has the advantage of not modifying the nature of the second surface. In particular, if the previously defined order of the electrodes is respected, there is no carbonate deposit formed on the surface of the glass. In order words, it is not necessary to "wash" the glass after treatment to remove the sodium as we will see below.

Figure 8:
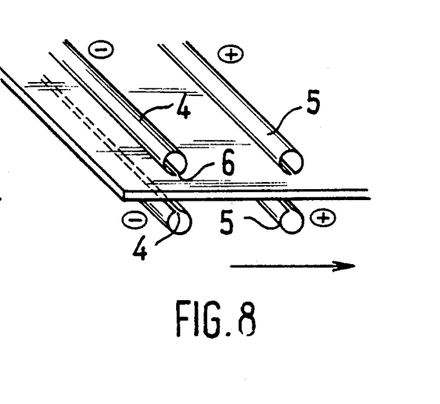
FIG. 8 is an analogous diagram to the preceding one corresponding to simultaneous treatment on the two surfaces.

The absence of migration of the ions from one surface to the other which is obtained by arranging the two electrodes on the same side of the sheet further offers increased advantages for the treatment of the two surfaces of the sheet. This can be obtained by means of an assembly such as is shown in FIG. 8. In this assembly an anode-cathode pair are arranged on each surface of the sheet, with the two anodes and the two cathodes being arranged symmetrically such that the exchanges can only take place between electrodes situated on the same side of the sheet. For this, it is of course appropriate for the geometric and electrical parameters to be the same for each pair of electrodes.

Figure 3:
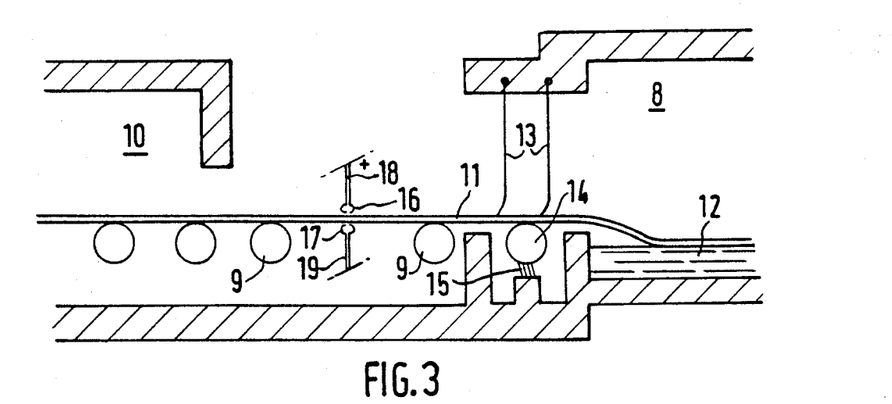
FIG. 3 is a cross-section diagram showing one embodiment for placing the deionization in accordance with the invention on a continuous production line for plate glass.

Since the treatment of the glass must be carried out at high temperature, the installation for using the invention must also contain means enabling heating of the glass. It is possible to carry out this heating by means arranged on the production line solely for this purpose. However, it is preferable to localize the treatment in an area where the glass is already at the adequate temperature. FIG. 3 shows the part of a production line in which the deionization electrodes, of the type previously described for FIG. 2, are arranged at the exit of a float furnace 8 through which the glass ribbon 11 passes.

The sheet taken up on the metal bath is removed at the extremity of the float 8. The exit from the float is conceived so as to provide dynamic sealing vis-a-vis the surrounding atmosphere. On the drawing, the sealing means are represented by curtains in a refractory material such as abestos. In the lower part, roller 14 and joint 14 complete this sealing means.

The glass ribbon 11, on exiting the float 8 or in immediate proximity thereto, is at a temperature on the order of 600° to 700° C. It is, therefore, in a satisfactory condition for carrying out the treatment in accordance with the invention without any reheating being necessary.

FIG. 3 shows two hollow electrodes 16 and 17 of the type of those of FIG. 2 with passages 18, 19 for the supply of the plasmagenic gas. A single pair of electrodes is shown but, it goes without saying, that several pairs of electrodes in series can be arranged.

The electrodes can also be enclosed in a chamber filled with the plasmagenic gas. In this case, it is possible to provide sealing means of the type used at the end of the float.

Ribbon 11 carried out by support rollers 9 then passes into a flattener 10 in which the reheating takes place.

The tests carried out by the inventors, varying the speeds of passage of the treated glasses, have shown that the nature of the results obtained with not modified. In other words, the increase in speed is equivalent to reducing the time of treatment. If it becomes too short and it is not possible to modify the speed because this is determined by production conditions, for example, it is then sufficient either to increase the treatment regimen, i.e., the intensity, or, when this is not possible or desirable—we have stated the reasons for which the intensity can vary only within relative narrow limits—to arrange several successive electrodes on the path of the sheet. In the tests, this situation was simulated by multiple passages of the sample between a pair of electrodes.

Using these means it is possible to adapt to the highest production speeds, i.e., up to 25 m/min on certain lines of floated glass, while still obtaining a sufficiently intense treatment Other features of the invention will become apparent in the course of the following descriptions of exemplary embodiments which are given for illustration of the invention and are not intended to be limiting thereof.

EXAMPLES

The tests reported below were conducted with hollow cylindrical electrodes with an exterior diameter of 6 mm. The longitudinal slit had an opening of 0.1 mm. The tests were carried out for different widths of electrode without the results being modified, outside of the difficulties related to an adjustment of the relative positions of the electrodes and the sheet of glass. In the present case, the distance separating the electrodes from the surface of the sheet of glass was adjusted, in each case, to approximately 1 mm.

Two types of samples were studied.

The first corresponded to a floated glass with a thickness of 2.9 mm, whose composition showed a content of alkaline oxides and alkaline-earth oxides as follows:

$Na_2O$: 13.45%; $K_2O$: 2.24%; CaO: 9%; MgO: 4%.

The second type of glass, obtained by casting was of the so-called "extra white" quality. Its thickness was approximately 4 mm and its composition was analogous to the preceding one. It was distinguished by an almost total absence of iron oxide. The results in this case were completely similar to those obtained with the first glass, in spite of the fact that the surface of the case glass was not identical to that of the floated glass.

A first series of tests enabled the analysis of the behavior of the samples in accordance with the field of temperature of the treatment.

In these tests, in addition to the temperature, the simultaneous modification of the imposed intensity must be pointed out. This was rendered necessary by the fact that, since the conductivity of the glass varies in a very substantial manner in accordance with the temperature, it is necessary, so as to avoid arc formation, to reduce the maximum intensity with the temperature. We have indicated that with regard to the treatment under consideration the variations in intensity only had an influence on the depth of deionization. Moreover, these differences in treatment can be compensated either by a greater or lesser speed of passage of the sample or, the equivalent, by a multiplicity of passages.

Since the treated layers have very small thicknesses, their analysis was carried out in particular by mass spectrum analysis of the ions detached from the sample by ion bombardment (the technique designated by the abbreviation SIMS). this method provides a quantitative analysis as a function of the depth.

Figure 4A:
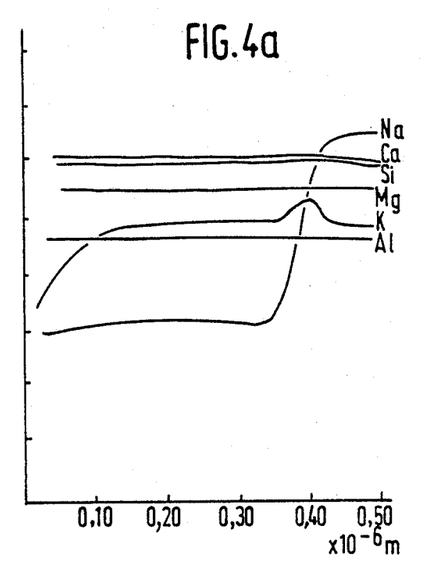
FIG. 4a is a graph measuring the content of the different elements in the surface layer for a treatment at low temperature.
Figure 4B:
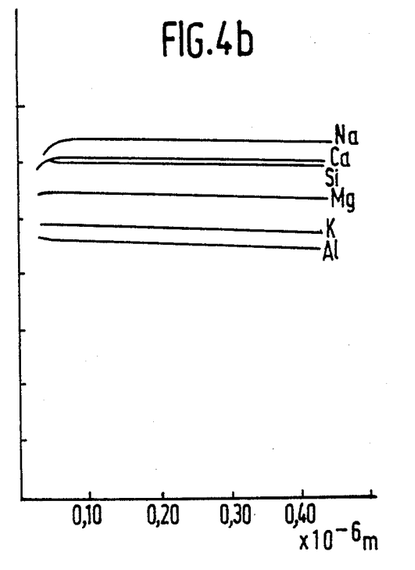
FIG. 4b is an analogous graph to that of FIG. 4a for the same untreated glass.
Figure 4C:
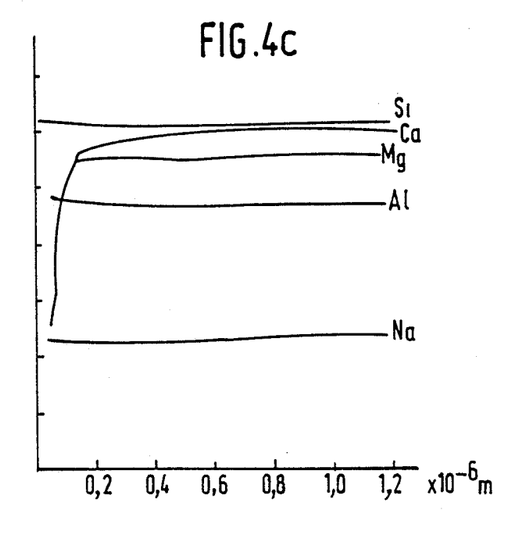
FIG. 4c is analogous to that of FIG. 4a and corresponds to an extended treatment at low temperature.

The results of the tests carried out at low temperature (180° C.) are given in FIGS. 4a, 4b, and 4c. In these tests the intensities were very low, on the order of 1 mA/cm.

More specifically, for the test whose results are given in FIG. 4a, the intensity was 1.7 mA/cm and the voltage was on average approximately 7000 V; for the one in FIG. 4c, the intensity was 1.16 mA/cm for a voltage of approximately 8000 V.

The graphs shown in the Figures show the relative variations of the different components as a function of the depth. These quantitative values (with no connection to each other) are given in a logarithmic scale.

FIG. 4a is typical of the result which is obtained at a low temperature. With regard to the graphs traced on the reference sample 4b, a very strong decrease in the sodium content can be noted in immediate proximity to the surface and, in the example being considered, up to a depth of on the order of 0.4 micron, similar behavior of the potassium can be noted but with less substantial variations due to the low initial content of this compound, and there was practically no modification in the content of the alkaline-earth ions, even in immediate proximity to the surface.

Graph 4c shows a similar result for an extended treatment of the sample. The behavior is substantially the same as above but the sodium deionization front is pushed back beyond the limits analyzed (1.20 microns), thus showing the capability of the technique with more or less deep treatments.

Elimination of the calcium and the magnesium can also be noted on this graph, but on an extremely low depth by comparison to that of sodium. This modification has no relationship to that which is obtained at a high temperature, as will be seen below.

Figure 5A:
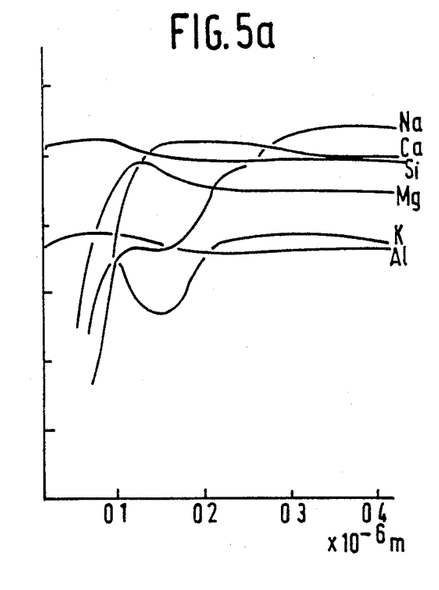
FIG. 5a is a graph, analogous to the preceding ones, for a "high temperature" treatment.
Figure 5B:
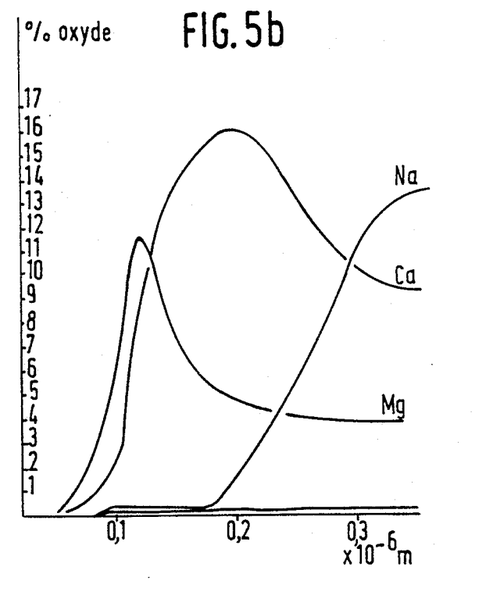
FIG. 5b shows the same result as that of FIG. 5a, but is a non-logarithmic scale.

The graphs of FIGS. 5a and 5b correspond to "high temperature" treatments (580° C.) at substantially greater intensities on the order of 50 mA/cm, a voltage of approximately 500 V and a speed of passage of 1.3 m/min. Graph 5a, on which the contents are expressed in accordance with a logarithmic scale, shows the specific characteristics of the high temperature treatment.

The alkaline-earth ions are eliminated from a surface layer with a significant depth, on the order of 0.1 micron. Contrary to what was observed in the example corresponding to FIG. 4c, it should be pointed out that the treatment in this case is not highly developed. This is shown by the relative positions of the "fronts" corresponding on the one hand to magnesium and calcium and on the other hand to sodium and potassium. In other words, a significant elimination of the alkaline-earth ions is obtained without carrying the treatment to the extreme limits. Furthermore, by working at the above-indicated highest temperatures, the migration speed of the alkaline-earth ions becomes very considerable. There ratio of the migration speed of the calcium to that of the sodium can therefore be estimated at approximately 0.45. The same ratio at 180° C. for the example of FIG. 4c is well below 0.1.

Under the above-indicated conditions, a homogeneous result is obtained, whichever of the two systems, high or low temperature, is used. The limits within which it is preferable to remain in order to have a homogeneous treatment under these conditions can be fixed approximately at temperatures below 150° C. on the one hand and on the other hand above 400° C. and preferably greater than 450° C. with a particularly preferred region area above approximately 500° C.

To facilitate the understanding of the graphs of FIG. 5a, FIG. 5b repeats the same results, using ordinates to show the contents of the various oxides in accordance with a linear scale. This Figure shows better than the proceeding ones the complete absence of alkaline and alkaline-earth ions in the part which is closest to the surface. In this part, the composition practically corresponds to pure silica. The "peaks" or protuberances of calcium and magnesium, which are located immediately after the front of these elements, are also typical of these treatments.

The treatment in accordance with the invention is even more remarkable due to its regularity. It can in effect be noted, still through SIMS analysis, that the fronts, and particularly the sodium front, are located at a very homogeneous depth over the entire extent of the treated surface.

The very high stability of the deionization carried out in accordance can also be noted. There is no new migration of the ions from the deep layers of the glass in the direction of the surface layer. This stability holds well, even when the temperature of the sample is relatively high. It has been particularly verified that, under conditions corresponding to the reheating of the glass sheets or even for much more severe conditions, a dealkalized layer was retained.

Figure 6:
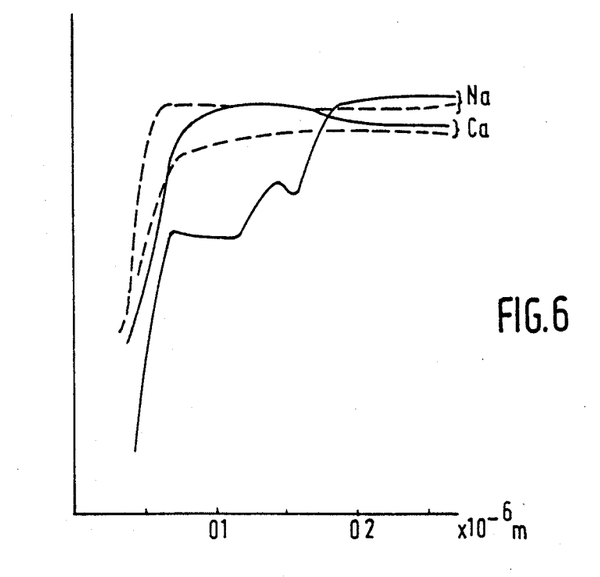
FIG. 6 shows the evolution of the results of the treatment in accordance with the invention, depending on whether or not the sample undergoes reheating.

By way of indication, FIG. 6 shows the development, on a same sample, of the SIMS concentration profile for sodium and calcium after treatment in accordance with the invention (continuous graphs, treatment at 515° C., intensity 50 mA/cm), and then after reheating at 600° C. for 15 minutes (graphs in broken lines). The reheating temperature was higher than those ordinarily used in industrial processes. In spite of these "unfavorable" conditions, it can be noted that the return of ions towards the surface layer is relatively limited. This is particularly the case for calcium ions. Moreover, the various tests carried out on this type of treatment seem to show that the diffusion of the alkaline ions is limited to the area extending to the front of the alkaline-earth ions. Combined, these two characteristics make it such that, even after reheating, a well deionized layer, which is essentially formed of silica, is maintained.

In the case of the treatment carried out with electrodes on a same side of the sheet, such as shown in FIG. 7, tests were carried out under the following conditions:

temperature of the glass: 540° C.,
distance between electrodes: 46 mm,
argon flow: 2 l/min,
speed of passage: 1 m/min,
intensity: 23 mA/cm
voltage: approximately 930 V.

Under these conditions, the SIMS studies show almost complete deionization at a depth of approximately 0.1 micron. This result can be distinguished from that obtained by using the electrodes on either side in that, on the line of the graphs of the type shown in FIGS. 5a and 5b, the "fronts" of the alkaline ions, particularly sodium, are almost confused with those of the alkaline-earth ions. Whatever the reason, this result shows that the deionization obtained is satisfactory.

The deionized layer has also been studied for its resistance with regard to electrolytes. The test was carried out in a cell, the walls of which were composed by the surfaces of the sample. The cell was filled with water (with high resistivity). Two platinum electrodes were plunged into the water. The assembly was thermostatted and the development of the conductivity was followed over time, i.e., the possible passing into the water of ions coming from the surfaces of the sample.

For reference samples a rapid growth in conductivity was very quickly observed (a few hours). However, in the case of glasses treated in accordance with the invention, the conductivity remained unchanged more than 40 days after the beginning of the test, at which time the test was stopped.

The deionization of glasses using the technique in accordance with the invention leads to interesting optical properties. In effect, an improvement in the transmission energy factor (FET), in light transmission (TL) and in the solar factor (FS) can be noted. Inversely, the treated glasses have a lesser reflection energy factor (FER) and lesser light reflection (RL).

The optical properties were measured for all the samples prepared. By way of indication, the following Table shows the measured values for samples corresponding to FIGS. 5a-b and 6 (for both states, before and after reheating). The results were compared with those obtained with an untreated reference sample T. The 100% value for the transmission is that which corresponds to a sheet of air.

|  | FET | d FET | TL | d TL | FER | d FER | RL | d RL | FS | d FS |
| --- | --- | --- | --- | --- | --- | --- | --- | --- | --- | --- |
| T | 87.9 |  | 90.8 |  | 7.8 |  | 8.0 |  | 89.0 |  |
| 5a-b | 88.3 | +0.4 | 91.7 | +0.9 | 6.8 | −0.1 | 6.5 | −1.5 | 89.6 | +0.6 |
| 6 | 89.0 | +1.1 | 92.5 | +1.7 | 6.3 | −1.5 | 5.9 | −2.1 | 90.2 | +1.2 |
| 6+ reheat | 88.7 | +0.8 | 91.7 | +1.1 | 6.7 | −1.1 | 6.6 | −1.8 | 89.9 | +0.9 |

In general, the results show optical modifications under the conditions of the invention which are on the order of:

| d FET: | +1%; | d TL: | 1.5%; | d FS: | +1%. |

These modifications are very considerable for glasses in which the transmission properties are the determining factors, particularly in the field of glasses used for the manufacture of photovoltaic components.

In addition, it can be noticed that even the most severe reheating test permits a large part of the improvements obtained using the treatment in accordance with the invention to remain.

The differences noted with regard to the optical properties, particularly those of transmission, between the samples corresponding to FIGS. 5 and 6 show that these properties do not vary uniformly as a function of the thickness of the deionized. layer. A theoretical study of this phenomenon in effect shows that, for a given wavelength, the light absorption of the optical assembly formed by superposed layers with different indices passes through a minimum and maximum series when the thickness of the surface layer is increased. The transmission factor, which is established for a whole wavelength range, minimizes this periodic influence of the thickness of the surface layer but does not completely eliminate it. This explains the fact that there can be better improvement in transmission in the case of FIG. 6, where the front lacking in calcium is a little less "deep", than in the case of the sample of FIG. 5.

It is further possible, in accordance with the invention, to successively treat the two surfaces of the sheet of glass so as to obtain a deionized layer on each one. This can be obtained by successively passing the sheet between pairs of electrodes or series of pairs with reversed polarities. To prevent reverse diffusion of the elements removed during the first treatment, which can form carbonates on the surface of the sheet, it is possible to provide a "cleaning" of the surface between the two deionizations.

The cleaning in question can, for example, be in the form of a treatment with a reactive gas. This method is preferable since it provides hot cleaning. The two deionizations can therefore take place successively and directly without intermediate cooling and reheating between the two deionization operations.

It is of course also possible to carry out washing using a liquid, particularly water. Such a washing, however, requires cooling followed by a complete reheating between the successive deionizations of the two surfaces of the treated sheet.

Washing can take place when the electrodes are on either side of the sheet but it has been shown above that this could be prevented by using as assembly of the type shown in FIG. 8.

The treatment of the two surfaces of the sheets is preferable to provide them with the properties of chemical resistance which are specific to individual applications, in addition to the optical properties which have been mentioned above.

Experience also shows that the treatment on the two surfaces of the sheet provides a further improvement in the increases in the transmission energy factor, the light transmission and the solar factor and, correlatively, a decrease in the reflection energy factor and light reflection.

It is necessary to point out, in relation to what has been previously indicated about the existence of minimum and maximum properties as a function of the depth of the treatment, that the increases obtained with the treatment of the two surfaces takes these variations into account. In other words, the minimums and maximums which remain with the treatment of the two surfaces are located at higher levels the those which are noted after the treatment of a single surface.

The tests were carried out in the following manner.

The sample was treated a first time under the conditions corresponding to the test whose results are shown in FIGS. 5a–b. The sample was cooled, washed to remove the sodium which appeared on the surface. It was reheated under identical conditions to those of the treatment of the first surface. This corresponded to a treatment followed by reheating for the first treated surface. The second surface of the sample was treated under the same conditions as for the first passage.

The sample treated in this manner has the following characteristics:

|        | FET  | d FET | TL   | d TL | FER | d FER | RL  | d RL | FS   | d FS |
|--------|------|-------|------|------|-----|-------|-----|------|------|------|
| T      | 87.8 |       | 90.7 |      | 7.7 |       | 8.1 |      | 89.0 |      |
| sample | 89.5 | 1.7   | 93.1 | 2.4  | 6.1 | 1.6   | 5.5 | 2.6  | 90.6 | 1.6  |

Obviously, numerous modifications and variations of the present invention are possible in light of the above teachings. It is therefore to be understood that within the scope of the appended claims, the invention may be practiced otherwise and as specifically described herein.

What is claimed as new and desired to be secured by Letters Patent of the United States is:

1. A method for deionizing a surface of a glass sheet using a corona discharge means, comprising the steps of:
    (i) heating said glass sheet to a temperature below the softening temperature of said glass sheet;
    (ii) treating one or two sides of said heat glass sheet with a continuous current regulated corona discharge,
    (iii) continuously mutually moving said glass sheet and said corona discharge means relative to one another; and
    (iv) regulating the intensity of said corona discharge to obtain a uniform treatment of said continuously moving glass sheet relative to the distance between said glass sheet and said discharge means and to said temperature.

2. The method of claim 1, wherein said corona discharge is produced by linear electrodes extending parallel to said glass surface.

3. The method of claim 2, wherein the intensity of said corona discharge is between 1–400 mA/cm of said electrode.

4. The method of claim 3, wherein said intensity is between 20–400 mA/cm.

5. The method of claim 1, wherein said glass is heated to a temperature between about 100°–250° C. during said heating step.

6. The method of claim 1, wherein said glass is heated to a temperature between about 450°–750° C. during said heating step.

7. The method of claim 1, wherein said heating, treating, moving and regulating steps are conducted in an atmosphere comprising a plasmagenic gas.

8. The method of claim 7, wherein said plasmagenic gas is argon.

9. The method of claim 1, wherein said heating and sweeping steps are conducted at reduced pressure.

10. The method of claim 2, wherein the distance between said electrodes and said surface is less than or equal to 8 mm.

11. The method of claim 1, wherein said moving step is carried at a rate of between 0.5–25 m/min.

* * * * *